July 14, 1931.  H. B. TAFT  1,814,012
PROCESS OF MAKING ARTIFICIAL GRANITE
Filed Oct. 31, 1929
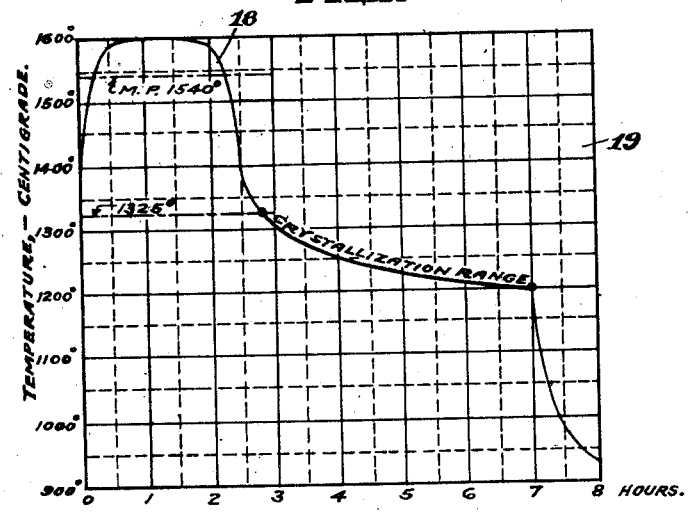
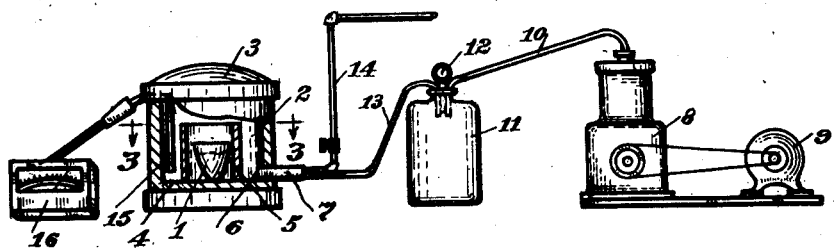
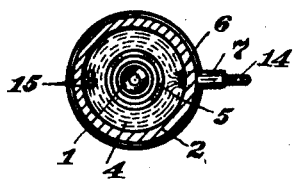
H. B. TAFT,
INVENTOR.
BY *William A. Hertle,*
ATTORNEY.

Patented July 14, 1931

1,814,012

UNITED STATES PATENT OFFICE

HOWARD B. TAFT, OF WILKINSBURG, PENNSYLVANIA, ASSIGNOR OF ONE-HALF TO NORRIS M. WELLMAN, OF PITTSBURGH, PENNSYLVANIA

PROCESS OF MAKING ARTIFICIAL GRANITE

Application filed October 31, 1929. Serial No. 403,661.

The present invention relates to the making of artificial or synthetic granite, and has for its objects the following useful purposes. When such artificial granite is made as it can be from small sized pieces of granite, the refuse piles of granite tailings, at the granite quarries can be used up, and monuments made of all kinds, just as well as from the large solid pieces now quarried in a solid mass from the stone quarries. The present invention contemplates the plastic handling of granite in a viscous form adapted to be poured into molds of any desired shape and size. The advantage of being able to use the granite in the plastic form is readily understood, when we consider the ornamental stone used for buildings, and for monuments and similar purposes. It is well known that such articles of manufacture are at the present time worked by hand carving, (which is expensive) in all cases where granite is required, and that all monuments for cemetery purposes are at present so made. By the present invention, such articles may be poured in molds of any desired shape, design or size readily, thus eliminating the expense of hand carving, either in place, or at the point of manufacture.

Further many articles like fountains, ornamental garden seats, and the like made at present by the use of cement or concrete, can now be made of granite, exactly like the original granite as found in the quarry, and at much less cost than if same were made of quarried granite and sculptured therefrom.

The present inventor has discovered that if granite is pulverized and heated to a point above the melting point, (1540 degrees centigrade), and then annealed through a certain range of temperature, called the "crystallization range", that the granite will recrystallize in substantially the same form as the original article, and with the same structure and outward appearance, and with hardly any loss in weight whatever. And moreover, if after the material is heated above the melting point, and then suddenly chilled instead of being annealed, that instead of a granite, a dark blue-black composition of homogeneous structure is obtained, which is in no respect anything like the natural mineral in appearance, and entirely useless for the purposes above outlined, and described for the product of the present discovery.

The inventor has also discovered that within the "crystallization range" of temperature, that the granite can be crystallized in either of two processes, which is to say that between the temperature limits of 1200 degrees, and 1325 degrees centigrade, the same effect is produced on the granite in the way of crystallization, by either holding the substance being heat-treated at a high temperature for a short time, or by holding same at a lower temperature for a much longer period of time; all of which will be brought out hereinafter in the following description of the invention.

In the accompanying drawings illustrating the invention, and its method of operation, Figure 1 is a time and temperature chart used to illustrate the periods of time required to perform the process of the present invention, and the temperatures which obtain throughout the said periods.

Figure 2 shows in a diagrammatic way the process of producing the synthetic granite.

Figure 3 shows a horizontal section of the furnace shown in Figure 2.

To produce the artificial granite of the present invention using the devices shown in the Figure 2, I proceed as follows. Twenty grams of powdered (let us say) "light Barre granite", having the usual characteristics and chemical analysis of such granite, is placed in an unglazed open top porcelain crucible, 1, and then deposited in the refractory blast burner furnace 2. The furnace 2 is provided with the usual refractory cover or top 3, a hearth 4, and a baffle cylinder 5, which is open at the top as shown. It will be seen that the purpose of the baffle cylinder of refractory material 5 is to protect the "charge" and the crucible 1 containing same from the direct force of the flame coming in at point 6, from the end of the blow-torch 7. In the Figure 2 it is seen that an air compressor 8 is provided, which is driven by a small motor 9, the compressed air being discharged through tube 10 into a jar or receiver 11, having a pressure gage 12 mounted thereon. The receiver acts as an accumulator, and gives a more even flow of air as same passes to the blow-torch 7 through the tube 13. Through another pipe 14 comes a supply of combustible gas, from a source not shown, and said gas supply passes also through the blow-torch 7, forming with the air under pressure a very hot flame at 6, when said gas is ignited, as is at once understood. Within the furnace 2, as is seen best in Figure 3, of the drawings, the flame passes around the baffle walls of cylinder 5, and does not directly impinge against the crucible 1, nor its contents of powdered granite. At 15 is shown in Figure 2 of the drawings, the end of a thermocouple, which forms part of an electrical pyrometer, same being used for determining the temperature of the furnace 2, as is at once understood.

Having placed the crucible 1, with its charge of powdered granite in the furnace 2, the temperature of the furnace is raised by means of the blow-torch, and its connected and supporting apparatus, just described, to the melting point, at about 1540 degrees centigrade as shown by the graph 18 shown on the chart 19 of Figure 1. To this molten mass twenty more grams of powdered granite is added, and the heat of the molten mass first deposited in the crucible, almost immediately melts the new or second charge placed in the crucible. The temperature of the furnace is still held at or above the melting temperature for a short time, when a third charge of pulverized granite is added to the crucible contents, making a total charge of sixty grams. The temperature of the whole mass of molten material is then raised to 1600 degrees centigrade and held at this temperature for a short time, to insure purification of the mass, and cause any gas which may have formed during the melting down process to come away from the mass, and by causing the iron and impurities to come to the surface in the form of slag, where same can be removed, or "skimmed" off. It is noted at this point, as the material being treated is in a molten form, same can now be poured into a mold, and allowed to solidify to a point where the article so formed can be handled as a unit, which in the present case I illustrate by the article of shape complementary to the interior form of the crucible 1. The article just formed is again placed in the furnace 2, and in the present case merely retained in the crucible 1 being used as a mold, and the temperature of the furnace is again raised to a point above the crystallization range, to wit, above the 1325 degree point centigrade, and allowed to slowly anneal down through the crystallization range of temperature, say to 1200 degrees, from which point the article may be reasonably quickly cooled without danger of cracking the surface of the article being produced by this process. The diagram of Figure 1, illustrates the crystallization range very well, and it is seen therefrom, that the "top" or highest point of the crystallization range, is about 1325 degrees, while the lowest point at which crystallization occurs is in the vicinity of 1200 degrees centigrade. It will be observed from the above mentioned chart of Figure 1, that the time of heating the mass to 1600 degrees, and down to say the high point of crystallization at 1325 degrees, takes about two hours and three quarters, while the annealing period through the crystallization range, takes about four hours, according to the chart. However it is found that if the mass of molten granite is treated for a comparatively short time, at a temperature (say) close to the high point of crystallization at 1300 degrees centigrade, the same effect can be produced so far as crystallization appearance, and desirability of product is concerned, as when the mass is subjected to a temperature (say) at or near the low point of the crystallization range such as 1210 degrees centigrade, for a comparatively long period of time. Which is to say that it is possible to crystallize out the molten granite more quickly, if the mass is held at the higher temperatures within the crystallization range, than if same is held nearer the lower temperatures of said range.

The product obtained by the above process of manufacture, is found to be very nearly like the original mineral in strength, so far as shock, and tensile strength is concerned, having a good "cleavage", and good grain appearance, and for all practical purposes is able to be worked like the natural mineral.

The advantages of the process just outlined, and the article of manufacture so produced is obvious from what has been said above, for instance, in the case of making monuments, after the granite is broken in size to pieces not larger than a walnut or smaller, a charge of say five tons is first heated in a suitable refractory furnace, and successively extra charges of one ton each can be added until the required full charge desired is reached, when the whole mass is then heated to 1600 degrees centigrade, and after the slag is removed, the melted material can be poured into refractory or heat resistant molds, which have the desired monument form, or design. After which the material is allower to cool to a point where the monument may be removed bodily from the mold, and placed in a lehr or kiln, in which the temperature is raised to around 1325 degrees centigrade and held there for a period such as will insure complete crystallization of the material, then it can be cooled slowly to ordinary temperatures, and sand-blasted, cleaned, "axed", or given any of the many finishes usually given to ordinary natural granite.

Reference has been made in the above to the advantages resulting from the ability to use the tailings from quarries which are of no use at the present time, to make artificial granite by the present process, and also to the savings effected by the ability to pour the granite in plastic form into molds of any desired design, thereby eliminating the cost of carving and the like, by expensive and very skilled workmen.

Attention is called to the fact, that in the first illustration described above six and three quarters hours was named as the time required for treating the small charge of material used, but it is evident that this period will vary according to the varying chemical composition of different kinds of granite, and also according to the size of the charge being treated. For instance the five ton charge above named will take a longer time in treatment than the smaller charge first described in this specification.

It is also seen that while I have described the production of granite using crushed natural mineral, it is evident that the same result may be accomplished by using the ingredients of natural granite in the proportions found in nature, and then applying the same process of heat treatment, and annealing as before described.

I claim:

1. In a process of making artificial granite articles, first charging a quantity of powdered granite into a crucible and raising the temperature to a point above the melting point of the granite; pouring the molten mass into molds; and then annealing the molten granite within the crystallization temperature range of same, to form artificial granite, of similar properties and appearance to the natural mineral.

2. In a process of making artificial granite, first charging a quantity of pulverized natural granite into a crucible, and raising the temperature to a point above its melting point; pouring the molten mass into molds of desired form and cooling the granite to a point of solidification; placing the granite article formed in the mold within a lehr, and raising the temperature to a point within the crystallization temperature range of the granite; and then annealing the article for such a period of time, within said crystallization temperature range, as will thoroughly crystallize the structure of the granite article, and form a granite of substantially similar physical and visual characteristics to those of the natural mineral.

3. A process of making artificial granite consisting of first charging a quantity of powdered natural granite into a furnace having a temperature above the melting point of the material being heat-treated; pouring the molten mass into molds having a desired form, and charging the molds and granite into a lehr, the temperature of which is within the crystallization range of the granite; and then annealing the article for such a period of time as will insure the complete crystallization of same, and provide an artificial granite article, of substantially the same characteristics as the natural mineral, in structure, qualities and appearance.

4. A process of making artificial granite comprising the charging of a quantity of the natural granite mineral, into a furnace having a temperature above 1540 degrees centigrade, the melting point of the material; pouring the molten mass into moulds; and then annealing the said material for a period of four and one-half hours within the crystallization temperature range of 1325 degrees to 1200 degrees centigrade, to form artificial granite having similar physical, and visual characteristics to those of natural granite.

5. In a process of making artificial granite, first charging a quantity of crushed granite into a crucible; applying sufficient heat for the length of time needed to thoroughly melt the batch; casting the material into molds, and allowing it to cool until the temperature has dropped sufficiently to permit handling of same; and then placing the casting in a reheating furnace or lehr, where sufficient heat is maintained and time allowed to thoroughly crystallize the casting until it has the appearance of natural granite, the time and temperature used depending on the grain, and crystalline structure desired, and on the size of the casting made.

In testimony whereof I affix my signature.

HOWARD B. TAFT.